United States Patent
Zhang et al.

(10) Patent No.: US 11,500,222 B2
(45) Date of Patent: Nov. 15, 2022

(54) LENS MODULE

(71) Applicant: AAC Optics Solutions Pte. Ltd., Singapore (SG)

(72) Inventors: Jin Zhang, Shenzhen (CN); Gang Li, Shenzhen (CN); Jiliang Lu, Shenzhen (CN); Linzhen Li, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 168 days.

(21) Appl. No.: 16/916,135

(22) Filed: Jun. 30, 2020

(65) Prior Publication Data

US 2020/0409167 A1 Dec. 31, 2020

(30) Foreign Application Priority Data

Jun. 30, 2019 (WO) ................ PCT/CN2019/094060

(51) Int. Cl.
*G02B 27/64* (2006.01)
*G03B 5/04* (2021.01)

(52) U.S. Cl.
CPC .............. *G02B 27/646* (2013.01); *G03B 5/04* (2013.01); *G03B 2205/0015* (2013.01); *G03B 2205/0076* (2013.01)

(58) Field of Classification Search
CPC .............. G03B 5/04; G03B 2205/0076; G03B 2205/0053; G03B 2205/0015; G03B 2205/00; G02B 27/646; G02B 27/64
USPC ........................................................ 359/813
See application file for complete search history.

(56) References Cited

U.S. PATENT DOCUMENTS

| | | | | |
|---|---|---|---|---|
| 9,518,566 B2* | 12/2016 | Eddington | ......... | H04N 5/23287 |
| 10,670,878 B2* | 6/2020 | Miller | ....................... | G03B 5/00 |
| 10,969,602 B2* | 4/2021 | Ladwig | ................... | G02B 7/08 |
| 11,048,098 B2* | 6/2021 | Howarth | .............. | G02B 27/646 |
| 11,073,702 B2* | 7/2021 | Miller | ................... | G02B 7/023 |
| 2015/0135703 A1* | 5/2015 | Eddington | ........... | G02B 27/646 60/528 |
| 2016/0320585 A1* | 11/2016 | Park | .......................... | G02B 7/00 |
| 2017/0336646 A1* | 11/2017 | Miller | .................. | H04N 5/2254 |
| 2018/0164536 A1* | 6/2018 | Park | ................... | H04N 5/23258 |
| 2018/0373056 A1* | 12/2018 | Ladwig | ............... | H05K 7/1417 |
| 2020/0132962 A1* | 4/2020 | Park | ..................... | G02B 27/646 |
| 2020/0192187 A1* | 6/2020 | Lee | .................... | H02K 41/0354 |
| 2020/0249424 A1* | 8/2020 | Ho | ........................... | G02B 7/09 |
| 2020/0271946 A1* | 8/2020 | Howarth | ................. | G02B 7/08 |

(Continued)

*Primary Examiner* — William R Alexander
(74) *Attorney, Agent, or Firm* — W&G Law Group

(57) ABSTRACT

Provided is a lens module, including a base, a lens holder fixed in the base, a support assembly, a shape-memory alloy wire configured to drive the lens holder to move in a direction perpendicular to an optical axis of the lens, a circuit board, and a conductive member fixed on the base. The shape-memory alloy wire includes a tail end, and a driving end connected to the lens holder. The conductive member includes a fixing portion mounted on the base, a connecting portion configured to be connected to the tail end of the shape-memory alloy wire, a terminal configured to be electrically connected to the circuit board, and a plurality of bent portions connected between the fixing portion and the terminal. An included angle α is formed between the terminal and the fixing portion and is greater than 90°.

10 Claims, 6 Drawing Sheets

(56) References Cited

U.S. PATENT DOCUMENTS

2020/0409029 A1* 12/2020 Zhang ................. G02B 27/646
2021/0033844 A1*  2/2021 Park ..................... H04N 5/2254

* cited by examiner

LENS MODULE

TECHNICAL FIELD

The present invention relates to the technical field of lens optical imaging, and particularly, to a lens module.

BACKGROUND

In recent years, portable terminals, such as smartphones and tablet computers, are all provided with high-performance lens modules. The high-performance lens modules generally have functions of auto focusing (AF) and optical image stabilization (OIS). The high-performance lens module allows the lens to move along an optical axis of the lens during autofocusing, and allows the lens to move along a direction perpendicular to the optical axis during optical image stabilizing. In the related art, shape-memory alloy wires are usually employed to drive the lens holder to move along the direction perpendicular to the optical axis for purpose of anti-shaking. However, the conductive member that fixes and supplies power to the shape-memory alloy wire has a relatively great height in the optical axis of the lens, resulting in a relatively great overall height of the lens module, which is not conducive to the lighting and thinning of the portable terminal.

Therefore, it is urgent to provide an improved lens module to solve the above problems.

SUMMARY

The present invention provides a lens module with a reduced overall height.

A lens module includes a base, a lens holder provided with a lens and fixed in the base; a support assembly configured to support the lens holder; a shape-memory alloy wire configured to drive the lens holder to move in a direction perpendicular to an optical axis of the lens; a circuit board configured to provide electrical signals; and a conductive member fixed on the base. The lens holder is suspended in the base by the support assembly, the shape-memory alloy wire includes a tail end, and a driving end connected to the lens holder, and the conductive member includes a fixing portion mounted on the base, a connecting portion arranged on one side of the fixing portion and configured to be connected to the tail end of the shape-memory alloy wire, a terminal arranged on the other side of the fixing portion and configured to be electrically connected to the circuit board, and a plurality of bent portions connected between the fixing portion and the terminal, wherein an included angle α is formed between the terminal and the fixing portion and is greater than 90°.

In an embodiment, the included angle α is 180°, and a plane of the fixing portion and a plane of the terminal are parallel to each other and are both perpendicular to the optical axis of the lens.

In an embodiment, the base comprises a substrate and a frame fixed on the substrate, and the substrate and the frame define a receiving space for receiving the lens holder, and the conductive member is fixed at an end of the frame facing towards the substrate, and a spacing between a surface, facing towards the substrate, of the fixing portion of the conductive member and a surface of the terminal facing towards the substrate is smaller than 0.5 mm.

In an embodiment, the spacing between the surface, facing towards the substrate, of the fixing portion of the conductive member and the surface of the terminal facing towards the substrate is smaller than or equal to 0.25 mm.

In an embodiment, an end of the connecting portion facing away from the terminal is bent to form a hook, the tail end of the shape-memory alloy wire is fixedly connected to the hook, a welding structure is provided at a side of the terminal, and the welding structure and the hook are both located at an inner side of the conductive member facing towards the lens holder.

In an embodiment, the connecting portion, the fixing portion, the plurality of bent portions, and the terminal are formed into one piece.

In an embodiment, the frame has a square shape and comprises four side plates disposed along a periphery thereof, at least one recess is provided in an end, facing towards the substrate, of each of the four side plates, and the conductive member is fixed in the at least one recess. Each of the at least one recess comprises a fixing step and a welding step, the fixing portion is mounted on the fixed step, and the terminal is located on the welding step. The welding structure and the hook are located at an inner side, facing towards the lens holder, of a corresponding one side plate of the four side plates that is fixed by the conductive member.

In an embodiment, the lens module as described in claim 7 further includes a housing. The base is installed in the housing. The housing includes a top wall, and side walls fixed to the substrate, and ends of the four side plates facing away from the substrate are connected to the top wall.

In an embodiment, an outer side of the conductive member facing away from the optical axis is space apart from an inner side of a corresponding one of the side walls close to the optical axis with a spacing.

In an embodiment, the spacing ranges from 0.02 mm to 0.08 mm.

By providing multiple bent portions between the fixing portion and the terminal, the included angle α greater than 90° is formed between the terminal and the fixing portion, which ensures stable welding of the conductive member and the circuit board, and reduces the height of the conductive member in the optical axis, thereby reducing the height of the lens module.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present invention. Moreover, in the drawings, like reference numerals designate corresponding parts throughout the several views.

REFERENCE SIGNS

Figure 1:
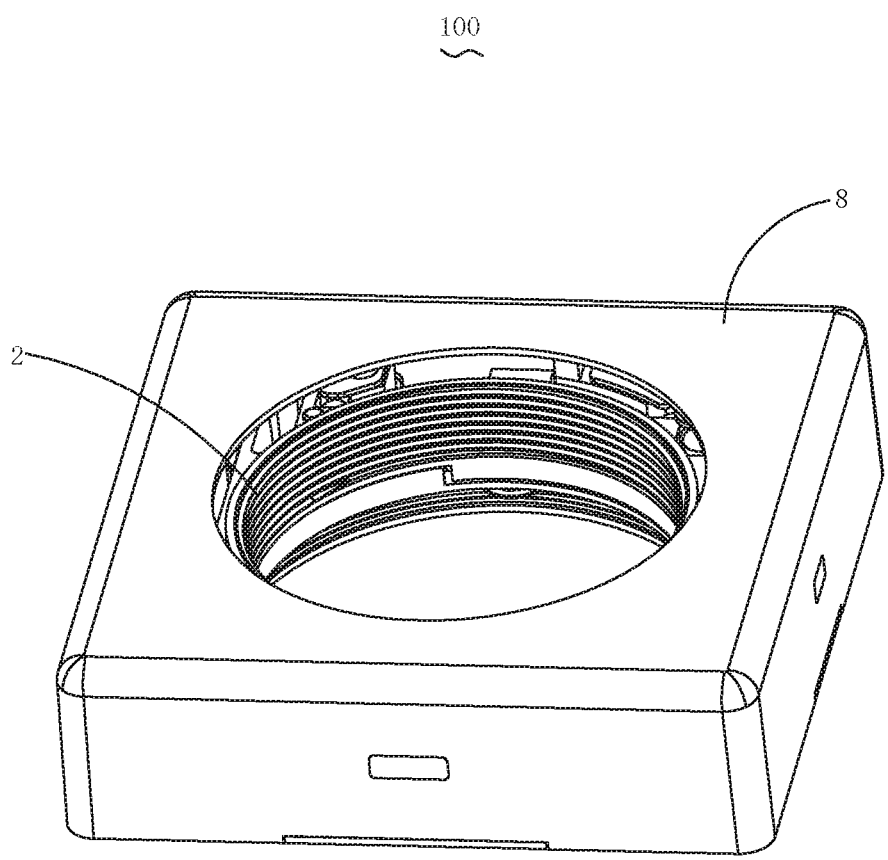
FIG. 1 is a three-dimensional schematic diagram of a lens module provided by an embodiment of the present invention.

100: lens module; 1: base; 11: substrate; 12: frame; 121: side plate; 2: lens holder; 3. circuit board; 4: support assembly; 5: shape-memory alloy wire; 51: tail end; 52: driving end; 6: conductive member; 61: fixing portion; 611: first surface; 62: connecting portion; 621: hook; 63: terminal; 631: welding structure; 632: second surface; 64: bent portion; 641: first bent portion; 642: second bent portion; 7: recess; 71: fixed step; 72: welding step; 8: housing; 81: top wall; 82: side wall.

DESCRIPTION OF EMBODIMENTS

The present invention is described in detail below with reference to the accompanying drawings and embodiments.

As shown in FIGS. 1-9, an embodiment of the present invention provides a lens module 100. The lens module 100 includes a base 1, a lens holder 2 provided with a lens (not shown in figures) and fixed in the base 1, a support assembly 4 configured to support the lens holder 2, a shape-memory alloy wire 5 configured to drive the lens holder 2 to move in a direction perpendicular to an optical axis of the lens, and a circuit board 3 configured to provide electrical signals. The lens holder 2 is suspended in the base 1 by the support assembly 4. The shape-memory alloy wire 5 includes a tail end 51 and a driving end 52, and the driving end 52 is connected to the lens holder 2. The lens module 100 further includes a conductive member 6 fixed on the base 1. The conductive member 6 includes a fixing portion 61 mounted on the base 1, a connecting portion 62 arranged at a side of the fixing portion 61 and configured to be connected to the tail end 51 of the shape memory alloy wire 5, a terminal 63 arranged at the other side of the fixing portion 61 and configured to be electrically connected to the circuit board 3, and a plurality of bent portions 64 connected between the fixing portion 61 and the terminal 63. An included angle α (not shown) between the terminal 63 and the fixing portion 61 is greater than 90°. By providing bent portions 64 between the fixing portion 61 and the terminal 63 and forming the included angle α greater than 90° between the terminal 63 and the fixing portion 61, it is not only ensured that the conductive member 6 is stably welded to the circuit board 3, but also reduces the height of the conductive member 6 in a direction of the optical axis, thereby reducing the height of the lens module 100.

Figure 2:
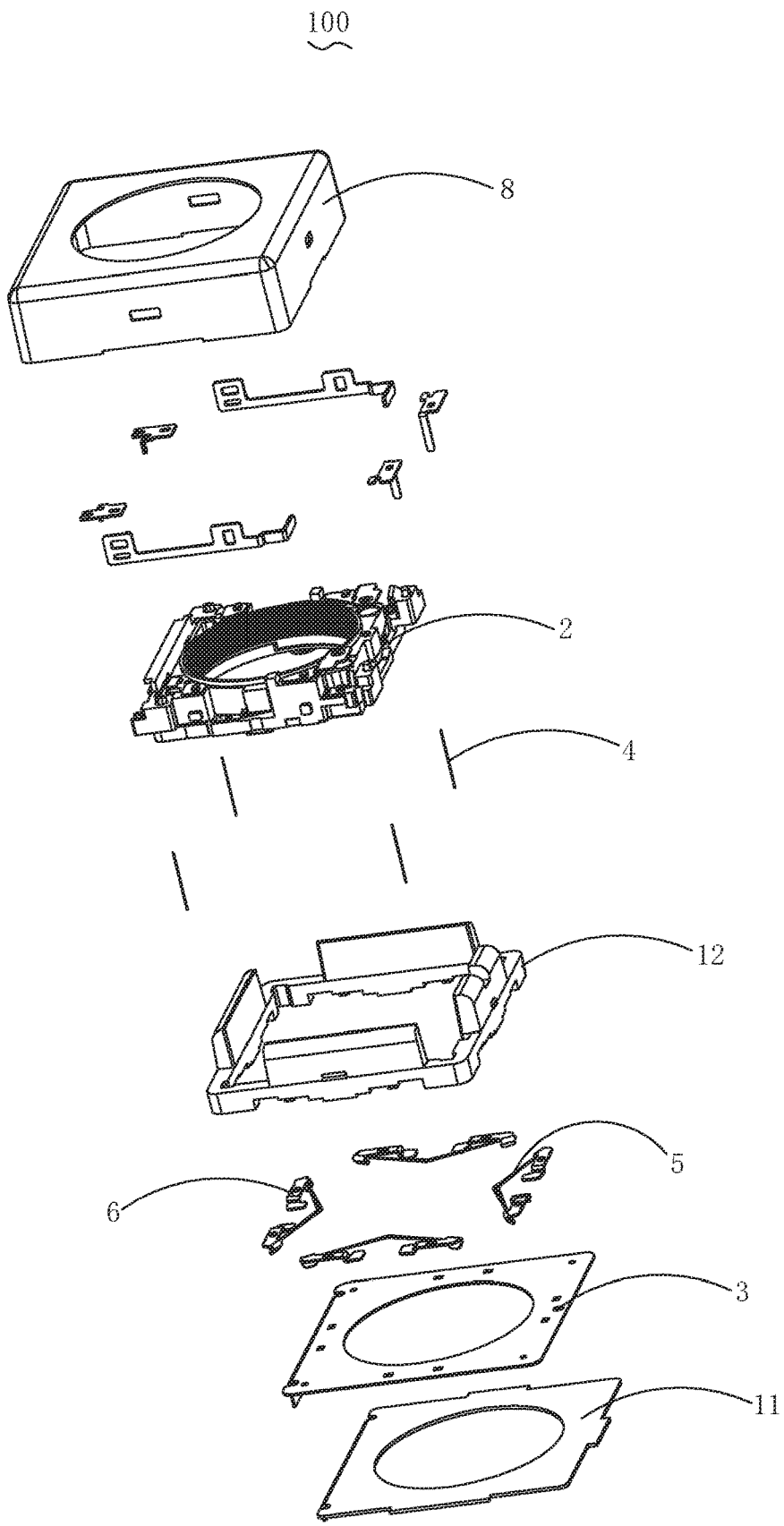
FIG. 2 is an exploded view of a lens module provided by an embodiment of the present invention.
Figure 3:
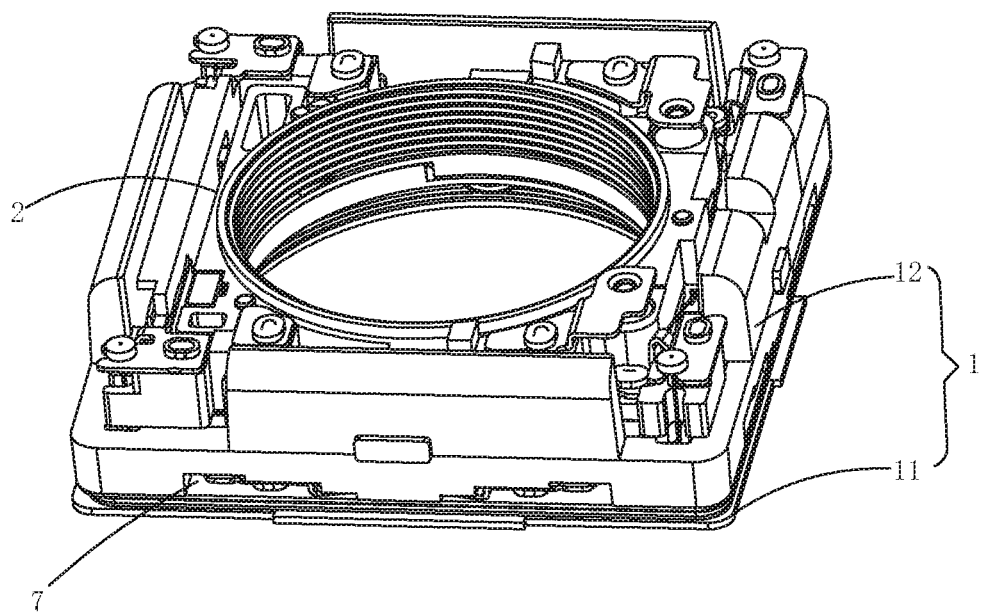
FIG. 3 is a three-dimensional schematic diagram of a lens module provided by an embodiment of the present invention in absence of its housing.
Figure 4:
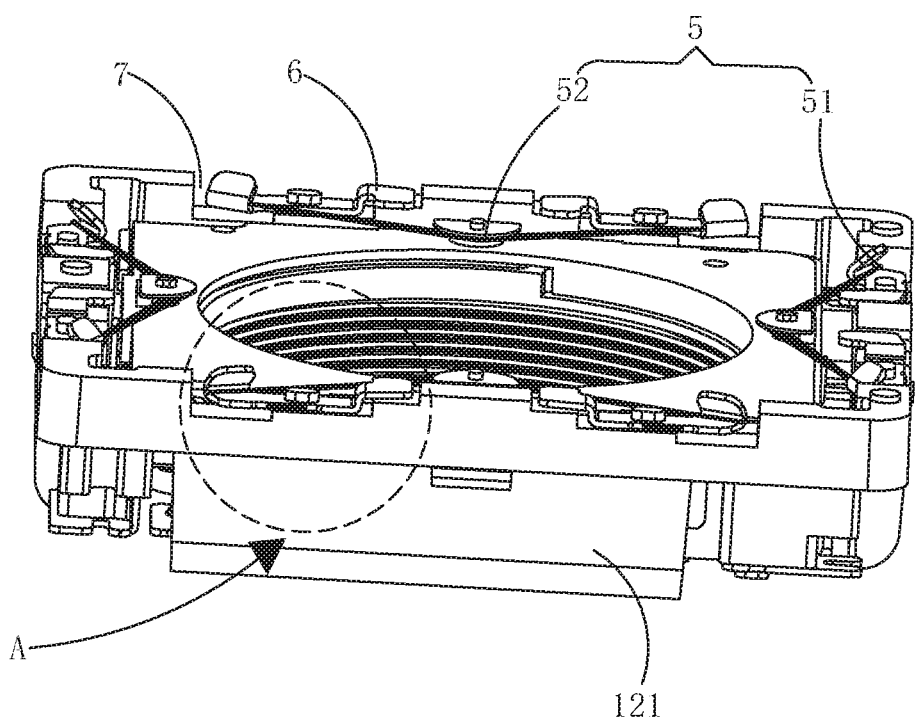
FIG. 4 is a three-dimensional schematic diagram of a lens module provided by an embodiment of the present invention in absence of its housing, substrate and circuit board.

Referring to FIGS. 2-4, the base 1 includes a substrate 11 and a frame 12 fixed to the substrate 11, the substrate 11 and the frame 12 define a receiving space for receiving the lens holder 2. The frame 12 has a square shape and includes four side plates 121 disposed along a periphery thereof. An end of the side plate 121 facing towards the substrate 11 is provided with at least one recess 7, and the conductive member 6 is fixed in the recess 7.

Figure 5:
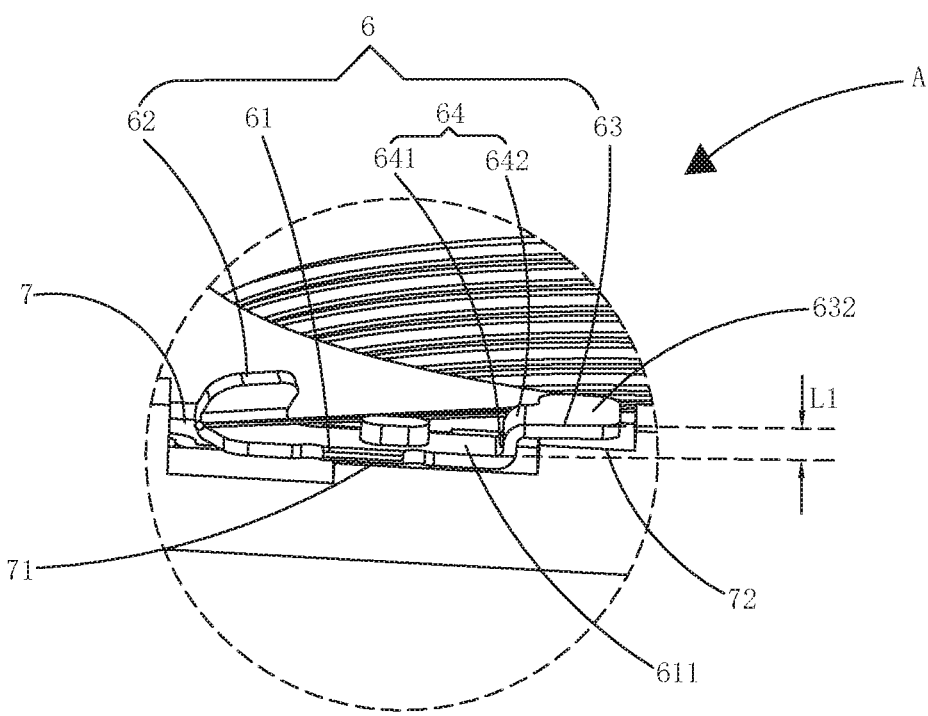
FIG. 5 is a partially enlarged view of a lens module at circle A shown in FIG. 4.

With reference to FIG. 5, the fixing portion 61 of the conductive member 6 includes a first surface 611 facing towards the substrate 11 in the direction of the optical axis of the lens, and the terminal 63 includes a second surface 632 facing towards the substrate 11 in the direction of the optical axis of the lens. The included angle α is included between the first surface 611 and the second surface 632.

In an embodiment, the conductive member 6 includes a first bent portion 641 connected to the fixing portion 61, and a second bent portion 642 connected to the terminal 63. The first bent portion 641 and the second bent portion 642 each have a bent angle of 90°, and thus an angle α included therebetween is 180°. In this way, a plane of the fixing portion 61 and a plane of the terminal 63 are parallel to each other and both perpendicular to the optical axis of the lens, thereby reducing the overall height of the conductive member 6 as well as achieving a simple design and an easy installation.

In an embodiment, a spacing L1 between a surface of the fixing portion 61 facing towards the substrate 11 and a surface of the terminal 63 facing towards the substrate 11 is smaller than 0.5 mm. In the present embodiment, the spacing L1 is a spacing between the first surface 611 of the fixing portion 61 and the second surface 632 of the terminal 63, and the spacing L1 is set to be 0.25 mm. The overall height of the conductive member 6 is reduced.

In an embodiment, an end of the connecting portion 62 facing away from the terminal 63 is bent to form a hook 621, and the tail end 51 is fixedly connected to the hook 621. A welding structure 631 is provided at a side of the terminal 63, and the welding structure 631 and the hook 621 are located at an inner side of the conductive member 6 facing towards the lens holder 2, which can facilitate the fixing of the shape-memory alloy wire 5 as well as the effectively welding of the conductive member 6 to the circuit board 3. In the present embodiment, the connecting portion 62, the fixing portion 61, the plurality of bent portions 64, and the terminal 63 are formed into one piece.

Figure 6:
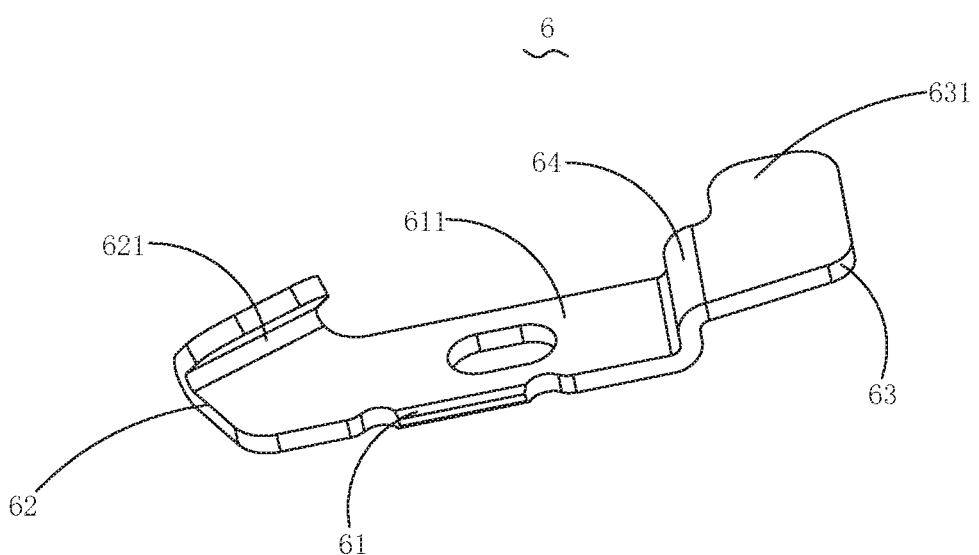
FIG. 6 is a three-dimensional schematic diagram of a conductive member provided by an embodiment of the present invention.
Figure 7:
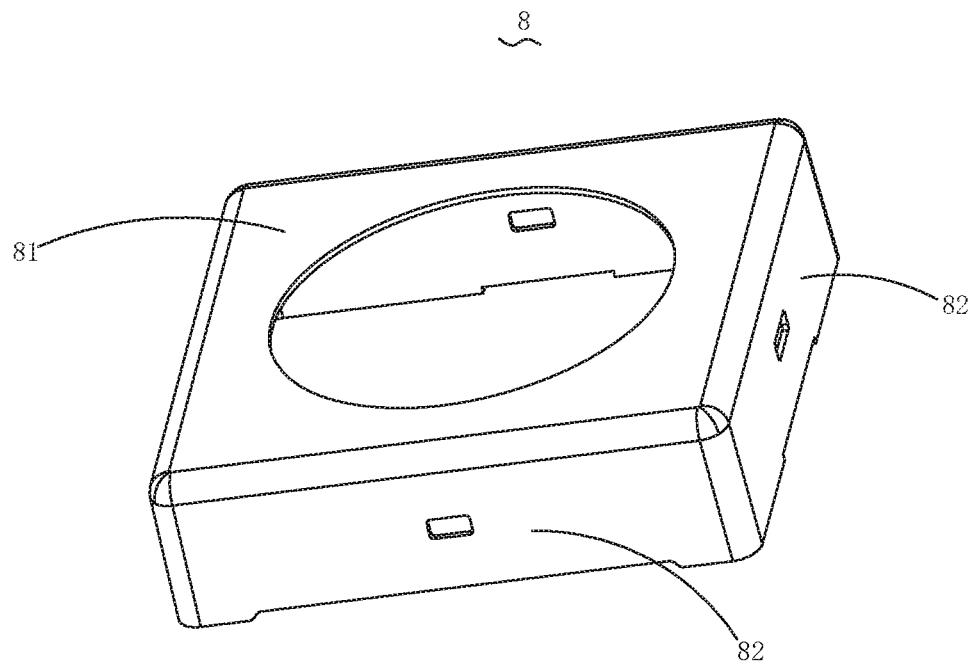
FIG. 7 is a three-dimensional schematic diagram of a housing provided by an embodiment of the present invention.
Figure 8:
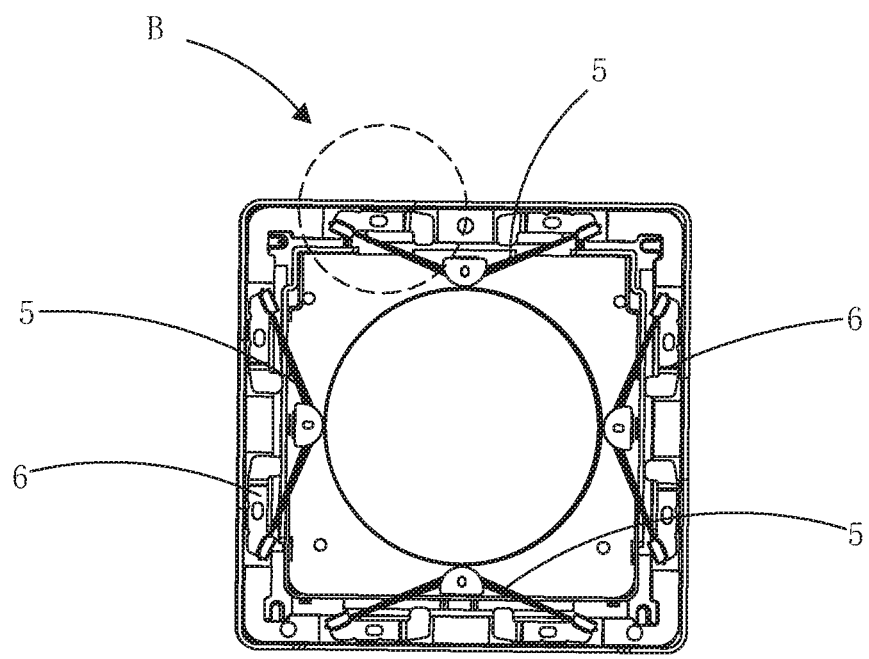
FIG. 8 is a three-dimensional schematic diagram of a lens module provided by an embodiment of the present invention in absence of its substrate and circuit board.
Figure 9:
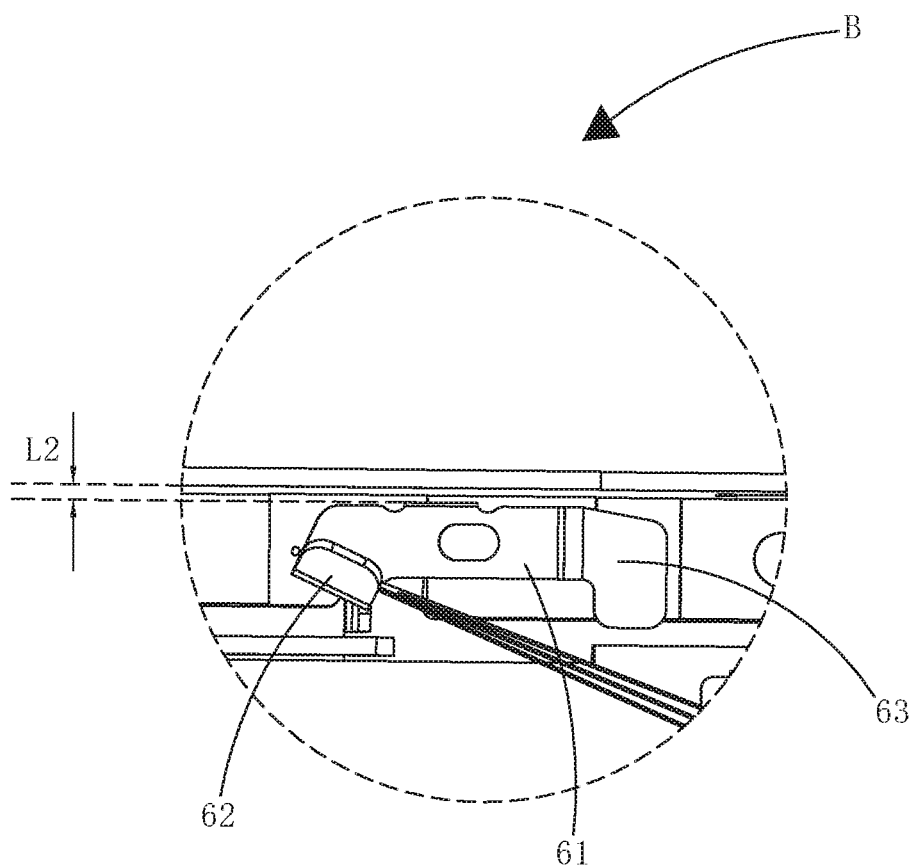
FIG. 9 is a partially enlarged view of a lens module at circle B shown in FIG. 8.

With reference to FIG. 5 and FIG. 6, the recess 7 includes a fixing step 71 and a welding step 72, the fixing portion 61 is installed on the fixing step 71, and the terminal 63 is located on the welding step 72. The welding structure 631 and the hook 621 are both located at an inner side, facing towards the lens holder 2, of the side plate 121 fixed by the conductive member 6. The conductive member 6 is installed in the recess 7 and cooperates with the shape-memory alloy wire 5 and the circuit board 3 to further reduce the overall height of the lens module 100.

In an embodiment, the lens module 100 further includes a housing 8 sleeved on the base 1, and the housing 8 includes a top wall 81 and side walls 82. The side walls 82 are fixed to the base plate 11, and ends of the side plate 121 facing away from the base plate 11 are connected to the top walls 81. By connecting the four side plates 121 to the top walls 81, the frame 12 supports the housing 8 and thus prevents the housing 8 from moving downwardly and damaging the components arranged inside the frame 12.

In an embodiment, an outer side of the conductive member 6 facing away from the optical axis is space apart from an inner side of a corresponding side wall 82 close to the optical axis with a spacing L2. The presence of the spacing L2 can prevent short circuits and damaging of the product.

In an embodiment, the spacing L2 is within a range from 0.02 mm to 0.08 mm. In an embodiment, the spacing L2 is set to be 0.05 mm, which not only ensures the strength of the conductive member 6 required to fix the shape-memory alloy wire, but also avoids the occurrence of the short circuit.

The foregoing descriptions are merely exemplary embodiments of the present invention. For those skilled in the art, improvements can be made based on the principle of the present invention, and should be included in the protection scope of the present invention.

What is claimed is:

1. A lens module, comprises:
a base;
a lens holder provided with a lens and fixed in the base;
a support assembly configured to support the lens holder;
a shape-memory alloy wire configured to drive the lens holder to move in a direction perpendicular to an optical axis of the lens;
a circuit board configured to provide electrical signals; and
a conductive member fixed on the base,
wherein the lens holder is suspended in the base by the support assembly,
wherein the shape-memory alloy wire comprises a tail end, and a driving end connected to the lens holder, and
wherein the conductive member comprises a fixing portion mounted on the base, a connecting portion arranged on one side of the fixing portion and configured to be connected to the tail end of the shape-memory alloy wire, a terminal arranged on the other side of the fixing portion and configured to be electrically connected to the circuit board, and a plurality of bent portions connected between the fixing portion and the terminal, wherein an included angle α is formed between the terminal and the fixing portion and is greater than 90°.

2. The lens module as described in claim 1, wherein the included angle α is 180°, and a plane of the fixing portion and a plane of the terminal are parallel to each other and are both perpendicular to the optical axis of the lens.

3. The lens module as described in claim 2, wherein the base comprises a substrate and a frame fixed on the substrate, and the substrate and the frame define a receiving space for receiving the lens holder, and
wherein the conductive member is fixed at an end of the frame facing towards the substrate, and a spacing between a surface, facing towards the substrate, of the fixing portion of the conductive member and a surface of the terminal facing towards the substrate is smaller than 0.5 mm.

4. The lens module as described in claim 3, wherein the spacing between the surface, facing towards the substrate, of the fixing portion of the conductive member and the surface of the terminal facing towards the substrate is smaller than or equal to 0.25 mm.

5. The lens module as described in claim 3, wherein an end of the connecting portion facing away from the terminal is bent to form a hook, the tail end of the shape-memory alloy wire is fixedly connected to the hook, a welding structure is provided at a side of the terminal, and the welding structure and the hook are both located at an inner side of the conductive member facing towards the lens holder.

6. The lens module as described in claim 5, wherein the connecting portion, the fixing portion, the plurality of bent portions, and the terminal are formed into one piece.

7. The lens module as described in claim 5, wherein the frame has a square shape and comprises four side plates disposed along a periphery thereof, at least one recess is provided in an end, facing towards the substrate, of each of the four side plates, and the conductive member is fixed in the at least one recess,
wherein each of the at least one recess comprises a fixing step and a welding step, the fixing portion is mounted on the fixed step, and the terminal is located on the welding step, and
wherein the welding structure and the hook are located at an inner side, facing towards the lens holder, of a corresponding one side plate of the four side plates that is fixed by the conductive member.

8. The lens module as described in claim 7, further comprising a housing, wherein the base is installed in the housing,
wherein the housing comprises a top wall, and side walls fixed to the substrate, and ends of the four side plates facing away from the substrate are connected to the top wall.

9. The lens module as described in claim 8, wherein an outer side of the conductive member facing away from the optical axis is space apart from an inner side of a corresponding one of the side walls close to the optical axis with a spacing.

10. The lens module as described in claim 9, wherein the spacing ranges from 0.02 mm to 0.08 mm.

* * * * *